(12) United States Patent
Abadi et al.

(10) Patent No.: US 9,983,983 B2
(45) Date of Patent: May 29, 2018

(54) AUTO-GENERATION OF TESTABLE UNITS FOR COBOL CODE

(71) Applicant: International Business Machines Corporation, Armink, NY (US)

(72) Inventors: Aharon Abadi, Petach Tikva (IL); Moria Abadi, Petach Tikva (IL); Yael Dubinsky, Haifa (IL); Yishai A Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/224,564

(22) Filed: Jul. 31, 2016

(65) Prior Publication Data

US 2018/0032425 A1 Feb. 1, 2018

(51) Int. Cl.
*G06F 9/44* (2018.01)
*G06F 11/36* (2006.01)

(52) U.S. Cl.
CPC ...... *G06F 11/3684* (2013.01); *G06F 11/3696* (2013.01)

(58) Field of Classification Search
None
See application file for complete search history.

(56) References Cited

U.S. PATENT DOCUMENTS

| 6,895,577 B1* | 5/2005 | Noble ................. G06F 11/3676 714/38.12 |
| 7,194,479 B1* | 3/2007 | Packham ............ G06F 11/3684 707/999.102 |
| 8,347,272 B2 | 1/2013 | Sugawara et al. |
| 8,448,146 B2* | 5/2013 | Pasala ................. G06F 11/3684 717/126 |
| 8,627,296 B1 | 1/2014 | Picard |
| 9,058,424 B1 | 6/2015 | Bienkowski et al. |
| 9,182,962 B2 | 11/2015 | Kneisel et al. |
| 2007/0033443 A1* | 2/2007 | Tillmann ............ G06F 11/3684 714/45 |
| 2010/0042970 A1* | 2/2010 | Gibbs .................. G06F 8/315 717/106 |
| 2012/0254665 A1* | 10/2012 | Pasala ................. G06F 11/3684 714/33 |

(Continued)

OTHER PUBLICATIONS

Creating an Enterprise COBOL test case with test data, IBM, Jun. 28, 2012.*

(Continued)

*Primary Examiner* — Insun Kang (57) ABSTRACT

A computer implemented method of automatically generating tests for COBOL code units, comprises using at least one hardware processor adapted to designate a COBOL source code comprising a plurality of code lines, extract automatically a plurality of code units each comprising a subset of the code lines for executing one or more functionalities of the COBOL source code, the code units are identified by analyzing the plurality of code lines, generate automatically one or more tests for testing each of the code units by generating an input stimulus for each of the code units, and create one or more mock code segments to simulate interaction of each code unit with one or more external code segment comprising code lines not included in the code unit and testing each code unit using the one or more test(s).

22 Claims, 8 Drawing Sheets (56) References Cited

U.S. PATENT DOCUMENTS

| | | | |
|---|---|---|---|
| 2013/0145351 A1* | 6/2013 | Tunik | G06F 9/4443 717/135 |
| 2013/0311830 A1* | 11/2013 | Wei | G06F 11/3684 714/32 |
| 2013/0326483 A1* | 12/2013 | Furodet | G06F 11/3688 717/124 |
| 2014/0282373 A1 | 9/2014 | Garza | |
| 2015/0135158 A1* | 5/2015 | Tenev | G06F 11/3684 717/101 |
| 2015/0331782 A1* | 11/2015 | Fors | G06F 11/3624 717/129 |
| 2015/0363301 A1* | 12/2015 | Chen | G06F 8/10 717/125 |
| 2016/0070640 A1* | 3/2016 | Clark | G06F 11/3684 717/124 |
| 2016/0147635 A1* | 5/2016 | Schwarzmann | G06F 11/3612 714/38.1 |
| 2016/0170863 A1* | 6/2016 | Finnie | G06F 11/3664 717/131 |

OTHER PUBLICATIONS

Unit Testing with zUnit, IBM, Sep. 5, 2014.*
Sjpeich., "Unit Testing COBOL and PL/I Applications with zUnit", Oct. 29, 2012. Can be found at: https://www.ibm.com/developerworks/community/blogs/e4210f90-a515-41c9-a487-8fc7d79d7f61/entry/unit_testing_cobol_and_pl_i_applications_zunit?lang=en.

* cited by examiner

AUTO-GENERATION OF TESTABLE UNITS FOR COBOL CODE

BACKGROUND

The present invention, in some embodiments thereof, relates to automatically generating tests for COBOL code units, and, more specifically, but not exclusively, to automatically generating tests for COBOL code units automatically extracted from a COBOL source code.

Software development and deployment involves major testing efforts that may require high resources, for example, processing platforms, time, personnel and/or the like.

Software testing may eventually be performed at system level where a complete software package, for example, a utility, an application, a service and/or the like is tested to validate the overall functionality, features and/or characteristics of the software package.

The software package may be typically be a complex package comprising a plurality of lower level functional modules (code units) each executing one or more limited functional operations. The code units may be tested using unit testing where the smallest testable parts of the software package may be independently tested and scrutinized for proper operation. Unit testing may reduce testing complexity by verifying each testable code unit prior to moving to overall system level testing of the entire software package. Unit testing may further allow faster and more pointed debugging and/or identification of failures, bugs, malfunctions, erroneous execution behavior and/or errors in the software package execution.

SUMMARY

According to some embodiments of the present invention there are provided methods for automatically generating tests for COBOL code units, comprising using one or more hardware processors for preforming the following:

Designating a COBOL source code comprising a plurality of code lines.

Extracting automatically a plurality of code units each comprising a subset of the plurality of code lines for executing one or more functionalities of the COBOL source code. The plurality of code units are identified by analyzing the plurality of code lines.

Generating automatically one or more tests for testing each of the plurality of code units by generating an input stimulus for the each code unit, and creating one or more mock code segments to simulate interaction of each code unit with one or more external code segments comprising one or more of the plurality of code lines not included in the code unit.

Testing each code unit using the one or more tests.

The plurality of code units coupled with one or more remaining code line of the plurality of code lines maintain an execution behavior of the COBOL source code. The one or more remaining code lines are not included in the plurality of code units.

The analysis comprises a text analysis, a static code analysis and/or a dynamic code analysis.

The interaction comprises accesses from the code unit to the one or more external segments. The accesses are made as part of control flow and/or data flow of an execution of the COBOL source code.

The interaction is identified by a code analysis comprising a static analysis and/or a dynamic analysis.

Optionally, each code unit is extended one or more missing flow control code entries to make each code unit an executable code entity.

Optionally, the one or more tests include setting one or more mock values in the one or more mock code segments to support the one or more tests.

The at least one value is set by a user.

According to some embodiments of the present invention there are provided systems for automatically generating tests for COBOL code units, comprising an input/output (I/O) interface, a program store storing a code and at least one processor coupled to the I/O interface and the program store for executing the stored code, the code comprising:

code instructions to designate a COBOL source code using the input interface, the COBOL source code comprises a plurality of code line;

Code instructions to extract automatically a plurality of testable code units each comprising a subset of the plurality of code lines for executing one or more functionalities of the COBOL source code. The plurality of code units are identified by analyzing the plurality of code lines.

Code instructions to generate automatically one or more tests for testing each of the plurality of code unit by generating an input stimulus for the each code unit and creating one or more mock code segments to simulate interaction of each code unit with one or more external code segments comprising one or more of the plurality of code lines not included in the code unit.

Code instructions to test each code unit using the one or more tests.

Optionally, a user interface is coupled to the one or more hardware processors for communicating with a user.

According to some embodiments of the present invention there are provided methods computer program products for automatically generating tests for COBOL code units, comprising a non-transitory computer readable storage medium and First program instructions to designate a COBOL source code comprising a plurality of code lines.

Second program instructions to extract automatically a plurality of testable code units each comprising a subset of the plurality of code lines for executing one or more functionalities of the COBOL source code. The plurality of code units are identified by analyzing the plurality of code lines.

Third program instructions to generate automatically one or more tests for testing each of the code units by generating an input stimulus for each code unit and creating one or more mock code segments to simulate interaction of each code unit with one or more external code segment comprising one or more of the plurality of code lines not included in the code unit.

Fourth program instructions to test each code unit using the one or more tests.

The first, second, third and fourth program instructions are executed by one or more hardware processors from the non-transitory computer readable storage medium.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to automatically generating tests for COBOL code units, and, more specifically, but not exclusively, to automatically generating tests for COBOL code units automatically extracted from a COBOL source code.

According to some embodiments of the present invention, there are provided systems and methods for analyzing a common business-oriented language (COBOL) source code to automatically create and/or extract one or more code units from and generating automatically unit test for testing the code unit(s). The COBOL source code may implement one or more functional modules (code units), for example, a business rule, an algorithm implementation, an applicable module and/or the like. The functional modules may include a plurality of code lines that may typically not be arranged per functional module, i.e. code lines of different functional modules may be mixed with each other within the COBOL source code, a scenario commonly known as "spaghetti code". Identifying and extracting the testable code unit(s) per their functionality is directed at generating automatically one or more unit tests for testing the code units. The code unit(s) may be identified using one or more analysis methods as known in the art, for example, static code analysis, dynamic code analysis and/or the like. Optionally, one or more users may indicate the code unit(s) in the COBOL source code. The identified code unit(s) are extracted from the COBOL source code and manipulated to make each of the code units an independent executable code unit that may be tested individually, i.e. independently from the remaining COBOL source code. The code unit(s) may be extended with missing control flow code entries. After extracting the code unit(s) and making them independent code entities, one or more unit tests are automatically generated. The test(s) comprise of generating means for injecting stimulus input to the code unit(s) and/or adapting the mock code segment(s) to test the code unit(s). The stimulus input may be injected by providing the code unit(s) with missing input data that may normally be provided by one or more other code segments (external code segments) of the COBOL source code. The test generation may further include generating one or more mock code segments to simulate access interaction between each of the code units and the external code segment(s) that are not included in the code unit. The overall execution behavior of the COBOL source code may be fully maintained by the combination of the code unit(s) and the remaining code segment(s) of the COBOL source code that is not included in the code unit(s) such that the execution path and/or behavior of the original of the original COBOL source code is maintained.

The unit test(s) may be used for testing each of the code units individually, i.e. separately from remaining of the COBOL source code. The tests may be conducted by assigning test values to the stimulus input and/or the mock code segment(s) values in order to debug, validate and/or verify the functional operation and/or behavior of each of the code units individually.

Extracting testable code units from the COBOL source code and automatically generating test for testing the code units may present major advantages. The COBOL source code may typically be a large code segment comprising extremely high count of code lines for implementing a plurality of functionalities. The COBOL source code may not arranged in a logical and/or functional order such that code lines of the same functional module are located together in the source code. Rather, the code lines of a plurality of functional modules of the COBOL source code may be mixed together making it extremely difficult and/or impossible to split the COBOL source code to lower level functional modules. Testing the entire COBOL source code at system level testing may be very complex and may require high resources such as, for example, time and/or personnel to debug the COBOL source code, isolate a root cause of a problem within the COBOL source code and/or validate the COBOL source code. By extracting the code units from the COBOL source code per functionality may and testing each of the low-level functional module implemented through a code units may provide an efficient testing environment. Each of the code units may be tested and verified individually before moving to system level testing and validation. The staged testing environment may significantly reduce the resources required for development, validation, integration and/or verification of the COBOL source code.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
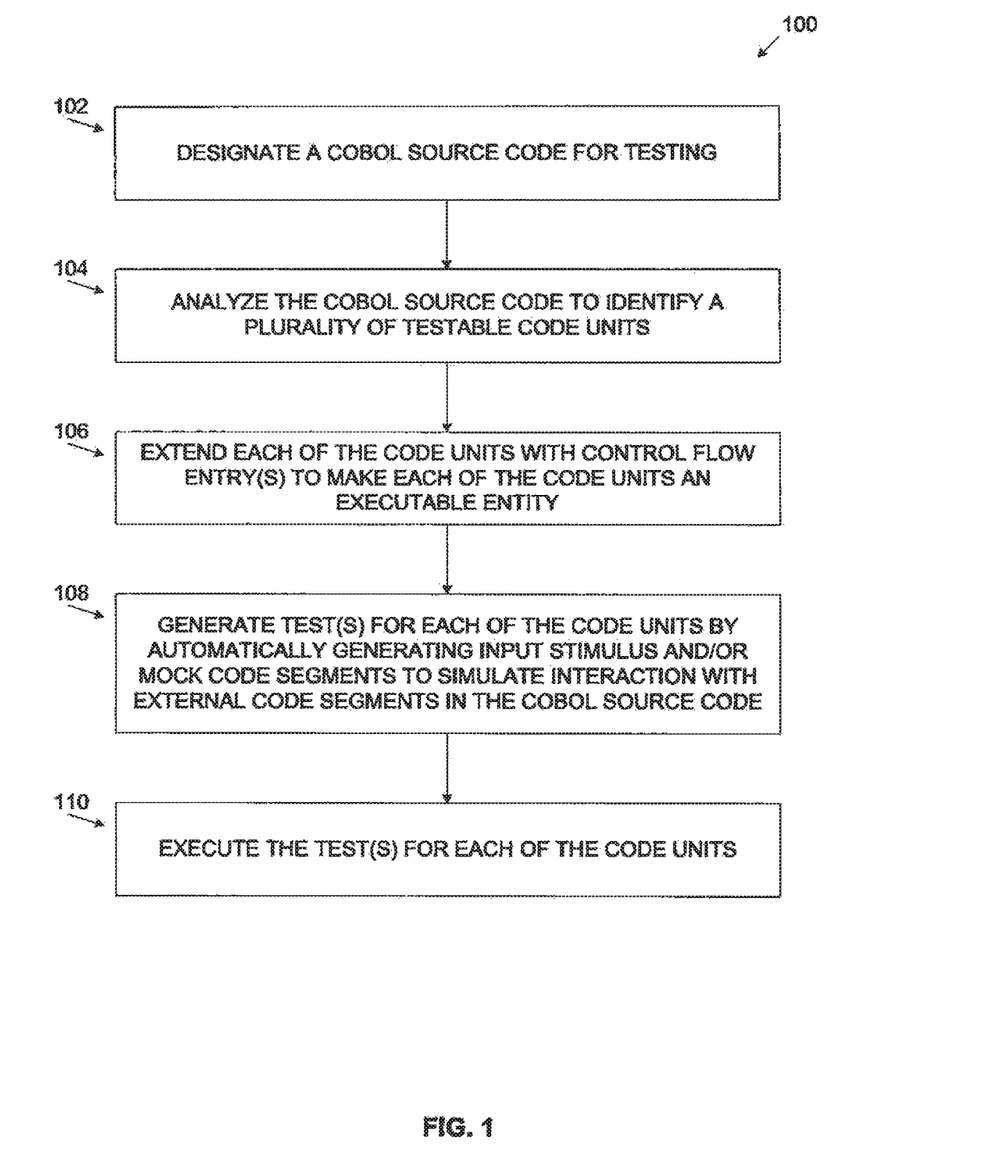
FIG. 1 is a flowchart of an exemplary process for automatically generating tests for code units extracted from a COBOL source code, according to some embodiments of the present invention.

Reference is now made to FIG. 1, which is a flowchart of an exemplary process for automatically generating tests for code units extracted from a COBOL source code, according to some embodiments of the present invention. A process 100 is executed to automatically generating unit tests for code units extracted from a COBOL source code by analyzing the COBOL source code to identify one or more testable code units. The identified code unit(s) are extracted from the COBOL source code and manipulated to make each of the code units an independent executable code unit. The manipulation of the code unit(s) includes providing the code unit with missing input data that may normally be provided by one or more other code segments of the COBOL source code. Once the independent executable code unit(s) is created, unit tests may be automatically generated to test the code unit(s). The test(s) generation may include creating means for injecting stimulus input to each of the code unit(s), for example, by providing the missing input data. The test(s) generation may further include creating one or more mock code segments to simulate access interaction between the code unit and one or more external segments of the COBOL source code that are not included in the code unit. With respect to the overall execution behavior of the COBOL source code, the code unit(s) combined with the remaining code of the COBOL source code that is not included in the code unit(s) follows the exact execution path as that of the original COBOL source code. Each of the code units may then be tested by assigning test values to the stimulus input and/or the mock code segment(s) in order to debug, validate and/or verify the functional operation and/or behavior of each of the code units individually.

Figure 2:
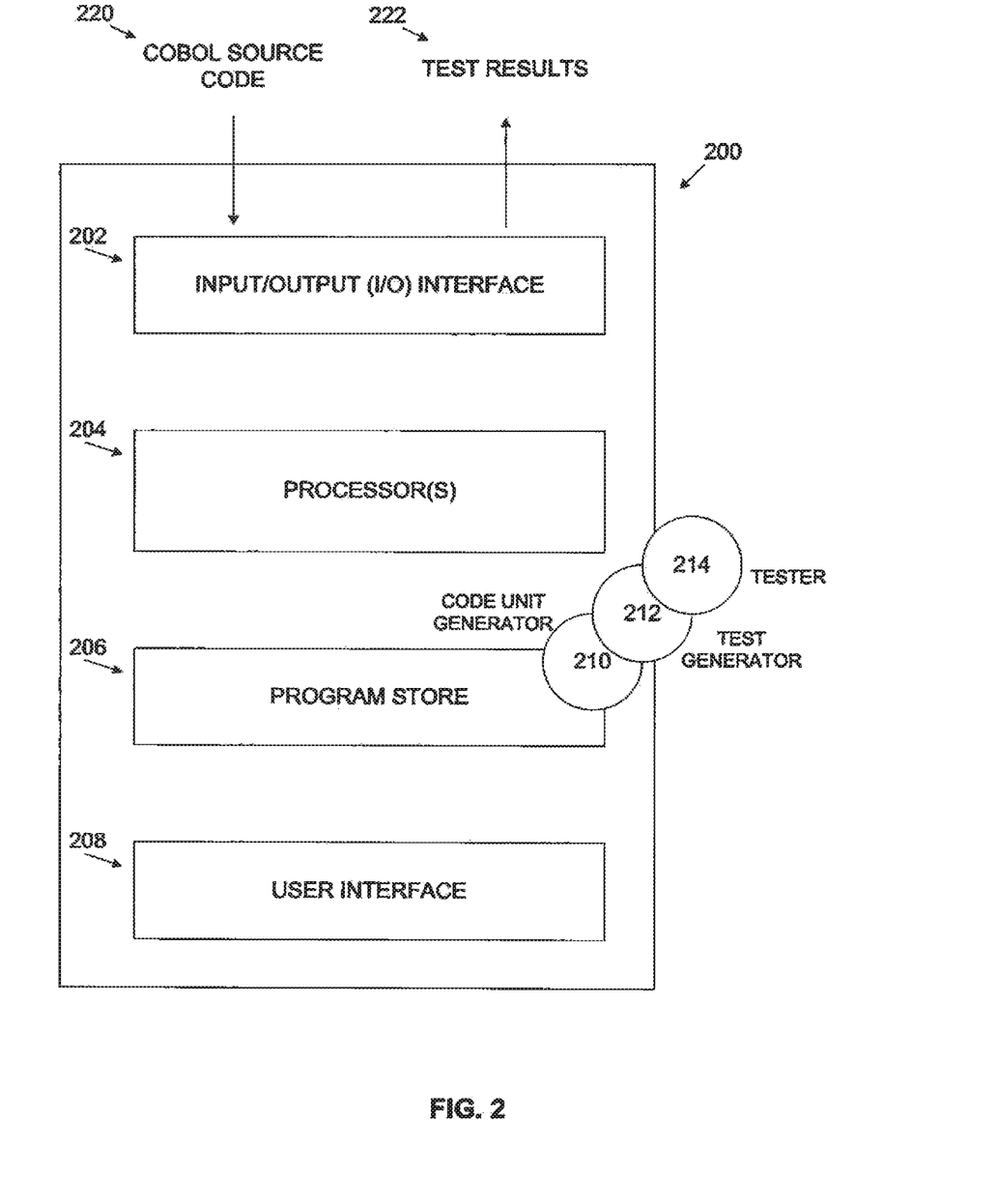
FIG. 2 is a schematic illustration of an exemplary system for automatically generating tests for code units extracted from a COBOL source code, according to some embodiments of the present invention.

Reference is also made to FIG. 2, which is a schematic illustration of an exemplary system for automatically generating tests for code units extracted from a COBOL source code, according to some embodiments of the present invention. A system 200 for executing a process such as the process 100 to generate automatically tests for code units extracted from a COBOL source code includes an input/output (I/O) interface 202 for designating the COBOL source code 220 and/or outputting test results 222, a processor(s) 204 and a program store 206. The COBOL source code 220 may include a plurality of code lines that may typically not be arranged per functionality of the COBOL source code, i.e. code lines of different functional modules may be mixed with each other within the COBOL source code, a scenario commonly known as "spaghetti code". The I/O interface 202 may include one or more interfaces, for example, a network interface, a memory interface and/or a storage interface for connecting to the respective resource(s), i.e. network resources, memory resources and/or storage resources. The I/O interface 202 may be used for designating, receiving and/or fetching the COBOL source code 220 from, for example, the memory, the network, storage such as the program store 206 and/or the like. Similarly, the I/O interface 202 may be used for storing and/or transmitting the test results 222 of the tests automatically generated for the code unit(s). The processor(s) 204, homogenous or heterogeneous, may be arranged for parallel processing, as clusters and/or as one or more multi core processor(s). The processor(s) 204 may further comprise one or more distributed processing clusters each comprising one or more processing nodes with processors having one or more processing cores. The distributed processing clusters may communicate with each other through one or more interfaces, for example, a network, a fabric, a direct interconnection, a link and/or the like. The program store 206 may include one or more non-transitory persistent storage devices, for example, a hard drive, a Flash array and/or the like. The program store 206 may further comprise one or more network storage devices, for example, a storage server, a network accessible storage (NAS) a network drive, and/or the like.

The process 100 may be executed by one or more software modules, for example, a code unit generator 210, a test generator 212 and/or a tester 214 each comprising a plurality of program instructions executed by the processor(s) 204 from the program store 206. Wherein a software module may be, for example, a process, an application, a utility and/or the like that comprising a plurality of program instructions stored in a non-transitory medium such as the program store 206 and executed by a processor such as the processor(s) 204.

The system 200 may further include a user interface 208 for interacting with one or more users. The user interface 208 may include a one or more human-machine interfaces, for example, a text interface, a pointing devices interface, a display, an audio interface and/or the like. The user interface 208 may include, for example, a graphic user interface (GUI) utilized through the human-machine interface(s). The GUI may further utilize a development platform, for example, an integrated development environment (IDE) presenting a UI and/or the like.

As shown at 102, the process 100 for automatically generating tests for code units extracted from a COBOL source code starts with the code unit generator 210 designating the COBOL source code 220 using the I/O interface 202. The COBOL source code 220 may provide one or more functionalities, i.e. functional code units, for example, a business rule, an algorithm implementation, an applicable module and/or the like that may each comprise a plurality of code lines distributed within the COBOL source code 220. The code units' code lines may be distributed in the COBOL source code 220 such that code lines comprising each functional unit may not be continuous but rather mixed (tangled) with code lines of other code unit(s).

As shown at 104, the code unit generator 210 analyzes the COBOL source code 220 to identify one or more of the code units. The code unit generator 210 may use one or more analysis methods for analyzing the COBOL source code 220, for example, a code static and/or dynamic analysis such as, for example, slicing and/or symbolic analysis to detect the execution path and/or functional characteristics of one or more of the code units within the COBOL source code 220. The analysis may further include a text analysis for analyzing one or more documents associated with the COBOL source code 220, for example, marketing material, programmer guide, user guide, release notes and/or the like to identify one or more traceability links between the documents text and the COBOL source code 220. The code unit generator 210 may use one or more ontologies identified in the documents that describe the functionality and/or behavior of the code unit(s). Optionally, one or more users, for example, a programmer, a system designer and/or the like may manually designate the code unit(s) using the user interface 208, the GUI and/or the IDE.

Figure 3:
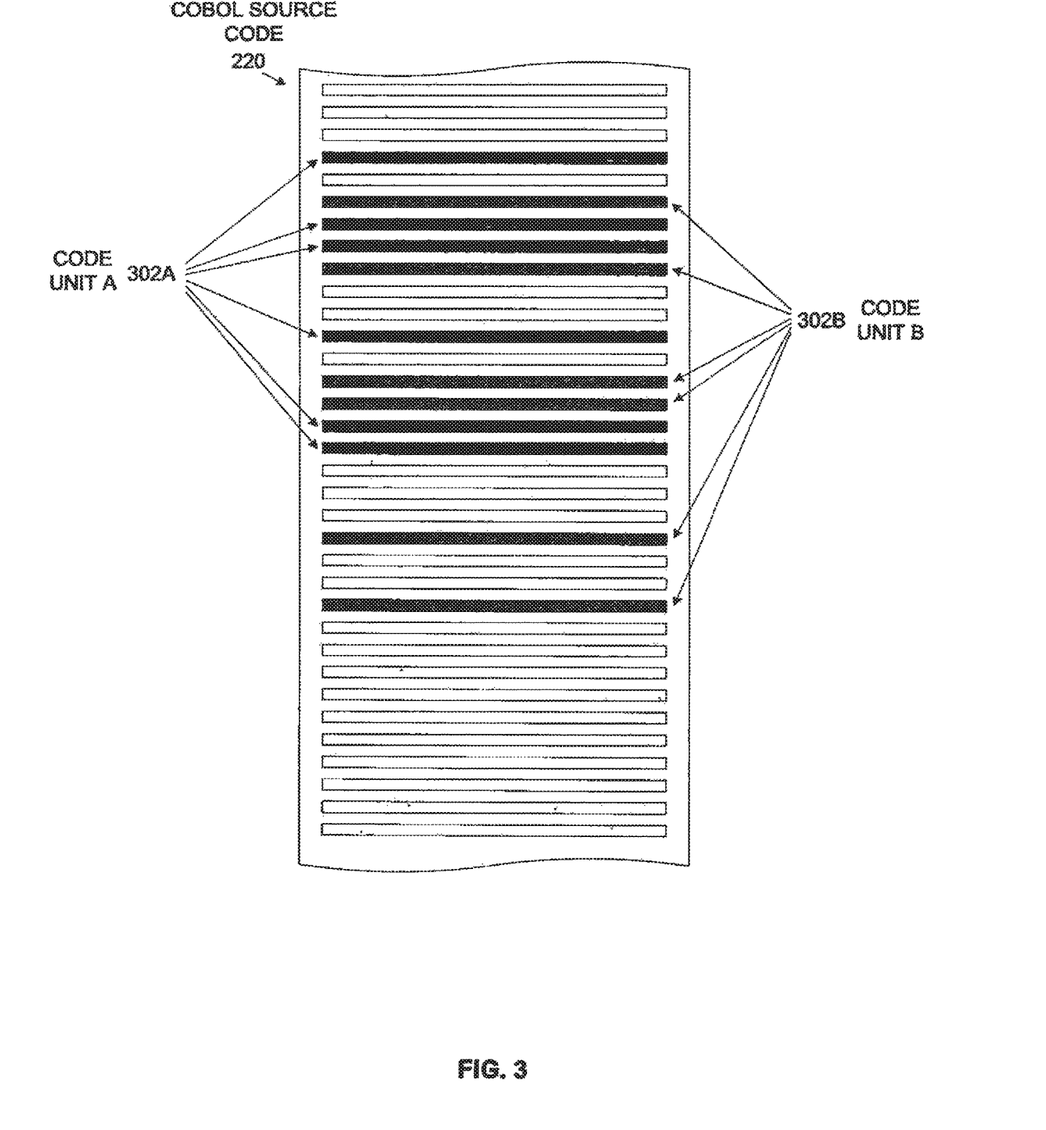
FIG. 3 is a schematic illustration of exemplary code units identified in a COBOL source code, according to some embodiments of the present invention.

Reference is now made to FIG. 3, which is a schematic illustration of exemplary code units identified in a COBOL source code, according to some embodiments of the present invention. Following the analysis made by a code unit generator such as the code unit generator 210, one or more code units 302, for example, a code unit A 302A and/or a code unit B 302B may be identified in a COBOL source code such as the COBOL source code 220. As shown, some code lines of the code unit A 302A and the code unit B 302B are not continuously located within the COBOL source code 220. The code lines are rather mixed with each other as well as with other code lines of a remaining code that is not part of the code unit A 302A and/or the code unit B 302B.

Reference is made once again to FIG. 1. As shown at 106, the code unit generator 210 may extend one or more of the detected code units 302 with one or more control flow entries to make each of the code units 302 an independent executable code entity. The code unit generator 210 may apply one or more methods as known in the art to analyze an execution path and/or behavior of each of the code units 302, for example, a static and/or a dynamic analysis. Based on the analysis the code unit generator 210 may extend the code unit(s) 302 with the missing control flow elements, for example, set a single point of entry and/or a single point of exit of the code unit 302. For example, assuming one of the code units 302 contains code inside a loop and code outside the loop, then the loop must be part of the code unit 302. Each of the code units 302 must preserve the dependencies of the original COBOL source code 220. This means that for every element s' in a code unit 302, if s' is reachable directly from other element s'' in the code unit 302 then that dependency exists in the original COBOL source code 220 and is reflected in the code unit 302.

As shown at 108, the test generator 212 generates one or more unit tests to test each of the code units 302. The test(s) are created to both inject stimulus input to the code unit 302 during testing as well as simulate a functional environment for the code unit 302 during the testing. The simulated functional environment is directed at simulating interaction the code unit 302 may have with one or more external code segments of the COBOL source code 220 that are not included in the code unit 302.

The test generator 212 may create means for injecting input stimulus to the tested code unit 302 in order to inject one or more missing data items, for example, a variable, a constant, a parameter, a data structure, a list, a database entry and/or the like to the code unit 302. The missing data items that may normally be provided to the code unit 302 from within the COBOL source code 220 may be injected during testing by the test code generated by the test generator 212. The test generator 212 may create one or more code structures, for example, a declaration, a data structure, a list, a database and/or the like to provide the missing data item(s) to the tested code unit 302. Optionally, the test generator 212 may create means for collecting output data items provided by the code unit 302 during the execution of the unit test(s).

Figure 4:
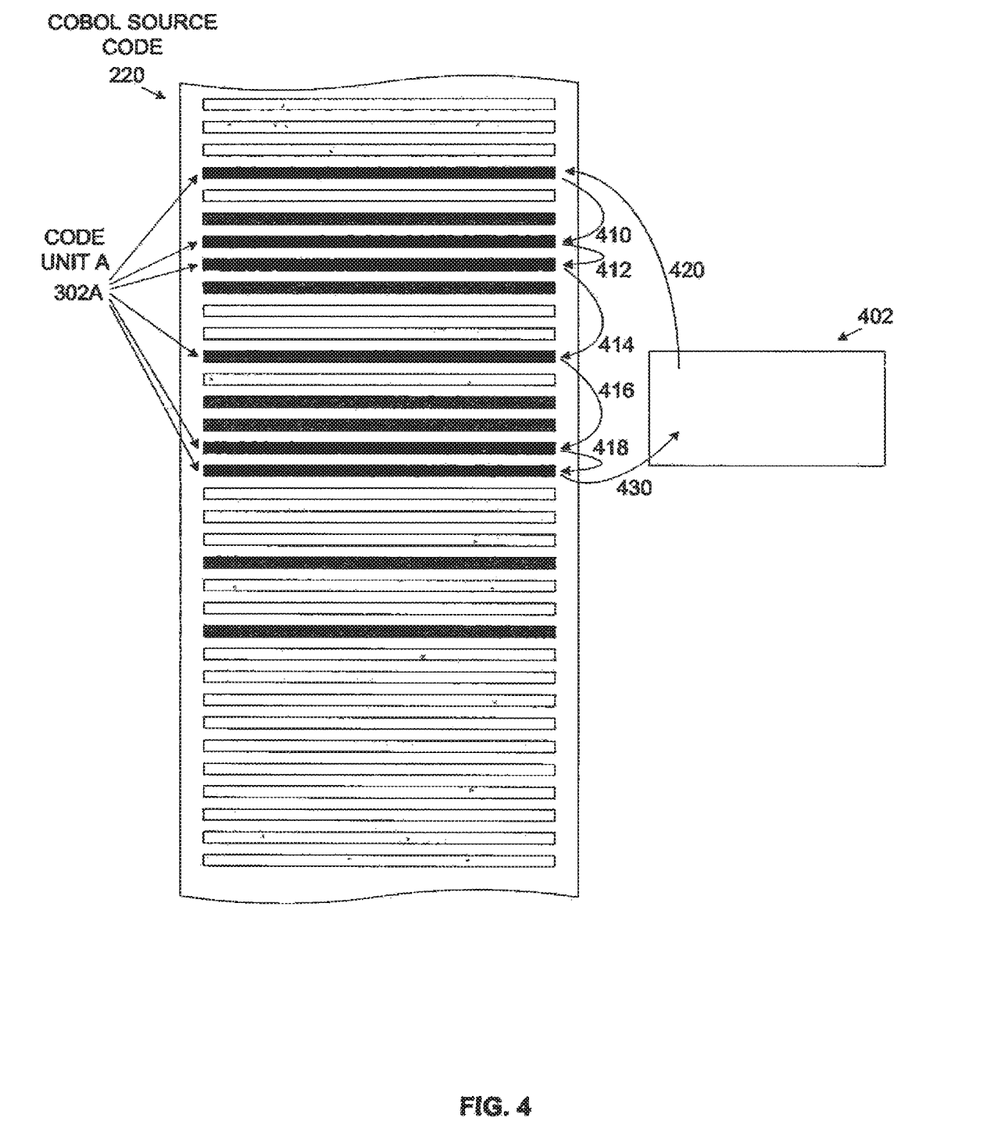
FIG. 4 is a schematic illustration of an exemplary data structure generated by a test generator for injecting input data to a code unit during unit testing, according to some embodiments of the present invention.

Reference is now made to FIG. 4, which is a schematic illustration of an exemplary data structure generated by a test generator for injecting input data to a code unit during unit testing, according to some embodiments of the present invention. A test generator such as the test generator 212 may create means for injecting input stimulus to a tested code unit such as the code unit 302, for example, the code unit A 302A. Some data items used by the code unit A 302A may be received from code included in the code unit A 302A as shown, for example, by transactions in 410, 412, 414, 416 and 418. However, some data items that may normally be provided by the external segment code(s) of the COBOL source code 220 are missing. The missing data item(s) may be provided by the means 402 for injecting the missing data items created by the test generator 212 as shown by a transaction 420. As shown by a transaction 430 the means 402 may be used to collect output data items provided by the code unit A 302A during the execution of the unit test(s).

Reference is made once again to FIG. 1. The test generator 212 may create one or more mock code segments to simulate one or more accesses from the code unit 302 to the external code segment(s). The mock code segment(s) simulate the interaction between the code unit 302 under testing and the external code segment(s). The test generator 212 may use one or more analysis methods, for example, a code static and/or dynamic analysis such as, for example, slicing and/or symbolic analysis for analyzing the code unit 302 and more specifically, the interaction between the code unit 302 and the external code segment(s). The test generator 212 may then create the mock code segment(s) based on interaction characteristics detected during the analysis to simulate the access interaction of the code unit 302 with the external code segment(s). For example, assuming a code unit 302 U calls an external function f (external code segment) with an input parameter i, the test generator 212 may create a mock code segment comprising a replacement function f as expressed in the pseudo code excerpt 1 below to simulate accesses from the code unit 320 U to the function f.

Pseudo Code Excerpt 1:

```
f (parameter i) {
    if (i = value 1)
        execute option 1;
    if (i = value 2)
        execute option 2;
    .
    .
    .
    if (i = value n)
        execute option n;
}
```

As seen in the pseudo code excerpt 1 the mock code segment may be adapted to execute differently, i.e. option 1 through n depending on the input parameter i received from the code unit 302 U.

Figure 5:
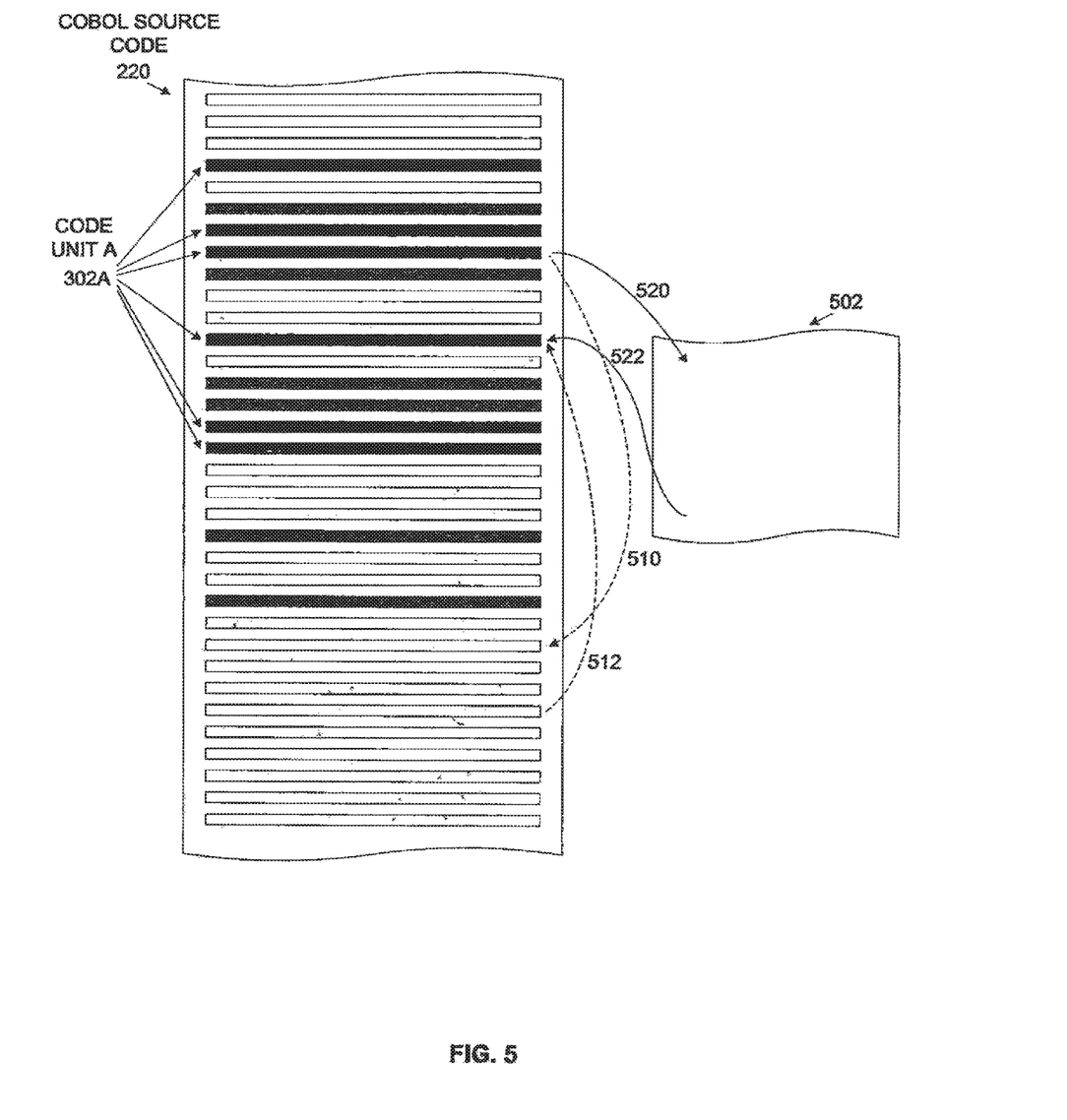
FIG. 5 is a schematic illustration of an exemplary mock code segment generated by a test generator for simulating interaction of a code unit with external code segment(s) during unit testing, according to some embodiments of the present invention.

Reference is now made to FIG. 5, which is a schematic illustration of an exemplary mock code segment generated by a test generator for simulating interaction of a code unit with external code segment(s) during unit testing, according to some embodiments of the present invention. A test generator such as the test generator 212 may create one or more mock code segments 502 for simulating one or more accesses such as, for example, an access 510 and/or an access 512. Where the access 510 may be initiated by a unit code such as the unit code A 302A to one or more external code segments not included in the code unit A 302A and the access 512 is a initiated by the accessed external code segment in response to the access 510. The mock code segment 502 simulates the accesses 510 and 520 with simulated accesses 520 and 522 respectively.

Reference is made once again to FIG. 1. As shown at 110, the tester 214 may use one or more of the generated unit tests for testing one or more of the code units 302. The tester 214 may assign values to the missing data item(s) by manipulating a created stimulus injection means such as the means 402. The tester 214 may assign values to the missing data items by applying one or more analysis methods, for example, a dynamic analysis of the unit code 302. The tester 214 may further analyze system level tests generated previously for testing the COBOL source code 220 in order to extract one or more candidate values for the missing data item(s). Additionally and/or alternatively, the tester 214 may apply a static code analysis and/or symbolic execution methods for computing one or more supersets of the candidate values for each of the missing data item(s).

Optionally, the missing data item(s) may be assigned to the unit test(s) by the user using the user interface 202 utilizing, for example, a GUI and/or an IDE.

The tester 214 may replace one or more values of the mock code segment(s) such as the mock code segment 502 with, for example, constant values. In case the value(s) of the mock code segment(s) 502 depend on input values and/or parameters provided by the code unit 302 accessing the mock code segment(s) 502, a set of values may be assigned to the value(s) of the mock code segment(s) 502 to allow the unit test(s) to adapt to the input values and/or parameters. The tester 214 may assign values to mock code segment(s) 502 by applying one or more analysis methods, for example, a dynamic analysis of the unit code 302. The tester 214 may further analyze system level tests generated previously for testing the COBOL source code 220 in order to extract one or more candidate values for the value(s) of the mock code segment(s) 502. Additionally and/or alternatively, the tester 214 may apply a static code analysis and/or symbolic execution methods for computing one or more supersets of the candidate values for each of the value(s) of the mock code segment(s) 502.

Optionally, the value(s) of the mock code segment(s) 502 may be assigned to the unit test(s) by the user using the user interface 202 utilizing, for example, a GUI and/or an IDE.

For example, continuing the previously presented example, assuming a code unit 302 U calls an external function f (external code segment). When the code unit 302 is tested for input value v1, the function f is called with a value u1 and returns a value t1. When the code unit 302 U is tested for input value v2, the function f is called with a value u2 and returns a value t2. The tester 214 may assign the values in the mock code segment replacing the function f as presented in pseudo code excerpt 2 below.

Pseudo Code Excerpt 2:

```
f(i){
    if (i = u1)
        return t1;
    if(i = u2)
        return t1;
}
```

As seen in the pseudo code excerpt 2 the mock code segment may be adapted to execute differently, i.e. return a different constant value t2 or t2 depending on the input parameter i received from the code unit 302 U during the test.

Figure 6:
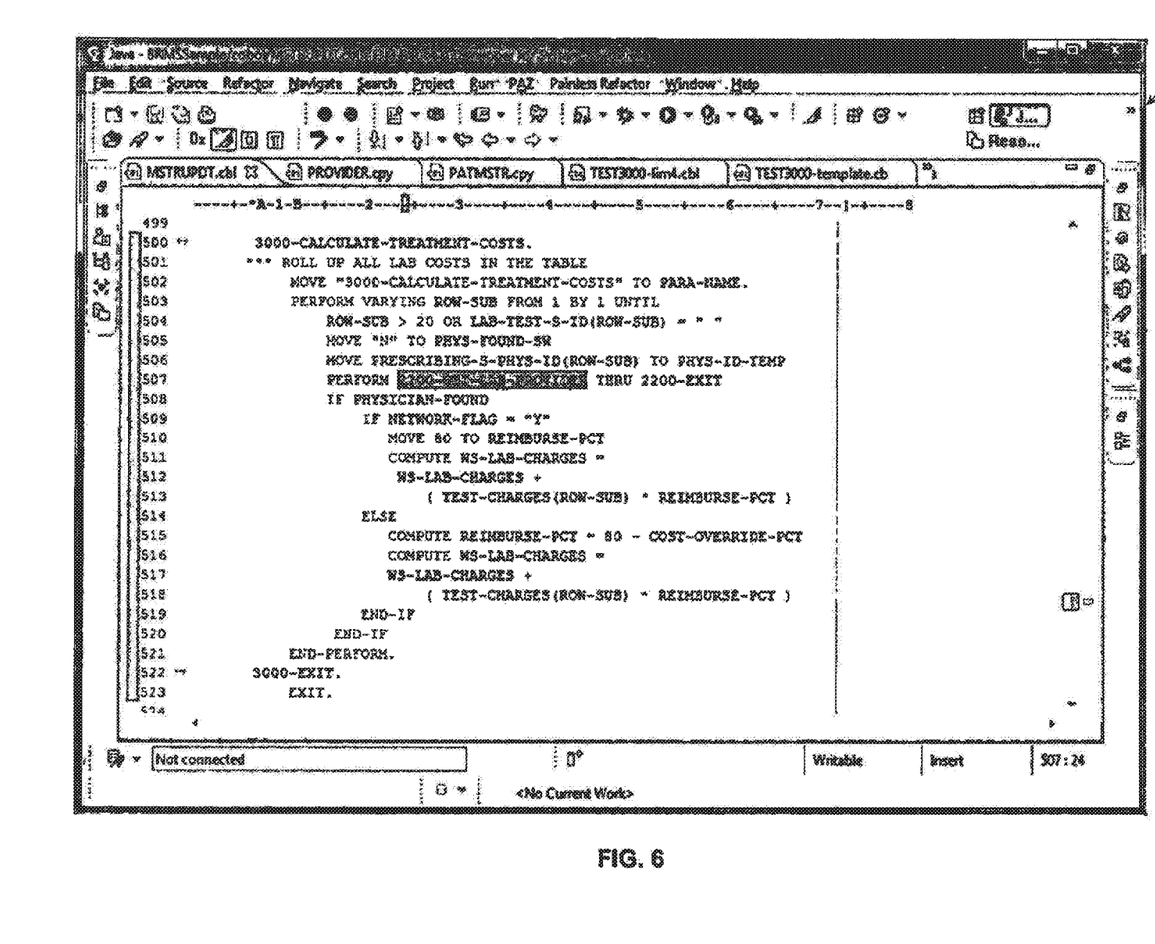
FIG. 6 is a screen capture of an exemplary code unit extracted from a COBOL source code, according to some embodiments of the present invention.

Reference is now made to FIG. 6, which is a screen capture of an exemplary code unit extracted from a COBOL source code, according to some embodiments of the present invention. A screen capture 600 presents an exemplary code unit such as the code unit 302 extracted from a COBOL source code such as the COBOL source code 220 by a code unit generator such as the code unit generator 210. As seen in the screen capture, the code unit includes a call to an external code segment, in this case a database access to a database designated 2200-GET-LAB-PROVIDER.

Figure 7:
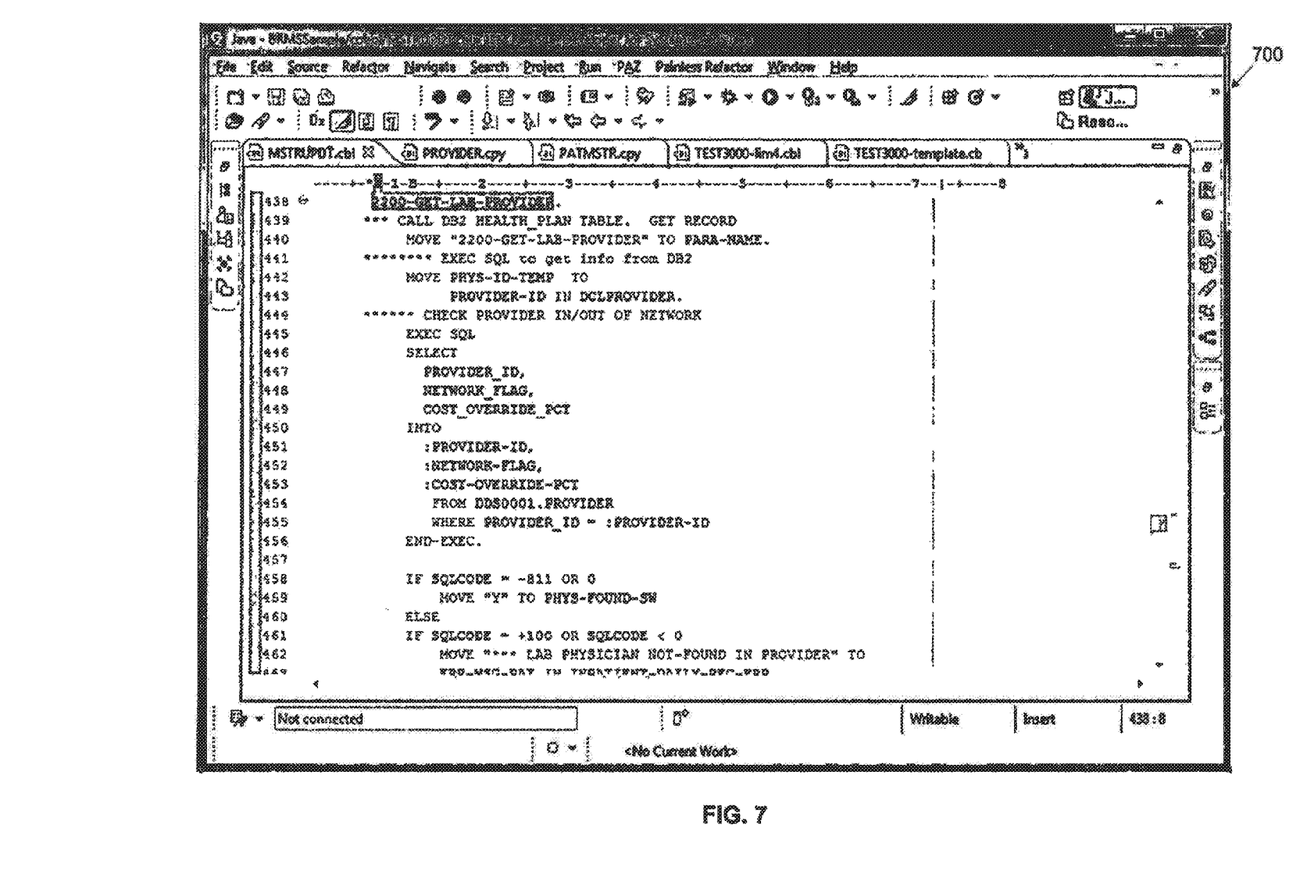
FIG. 7 is a screen capture of an exemplary external code segment accessed by an exemplary code unit extracted from a COBOL source code, according to some embodiments of the present invention.

Reference is now made to FIG. 7, which is a screen capture of an exemplary external code segment accessed by an exemplary code unit extracted from a COBOL source code, according to some embodiments of the present invention. A screen capture 700 presents an exemplary database 2200-GET-LAB-PROVIDER that may be accessed by an exemplary code unit such as the code unit 302 presented in the screen capture 600. The tester 214 may analyze the database 2200-GET-LAB-PROVIDER to detect one or more functional and/or operational characteristics of the database 2200-GET-LAB-PROVIDER, for example, type of data stored in one or more entries, a computation done in the database 2200-GET-LAB-PROVIDER in order to provide the requested data to the code unit 302 and/or the like. The analysis may include, for example, dynamic code analysis and/or profiling of system tests previously generated for testing a COBOL source code such as the COBOL source code 220. The analysis may also include a static code analysis and/or symbolic execution techniques as known in the art. Based on the analysis of the database 2200-GET-LAB-PROVIDER the tester 214 may assign values to the missing data items and/or adding values to one or more values of the mock code segment(s) used for simulating the accesses to the database 2200-GET-LAB-PROVIDER during execution of the unit test(s).

Figure 8:
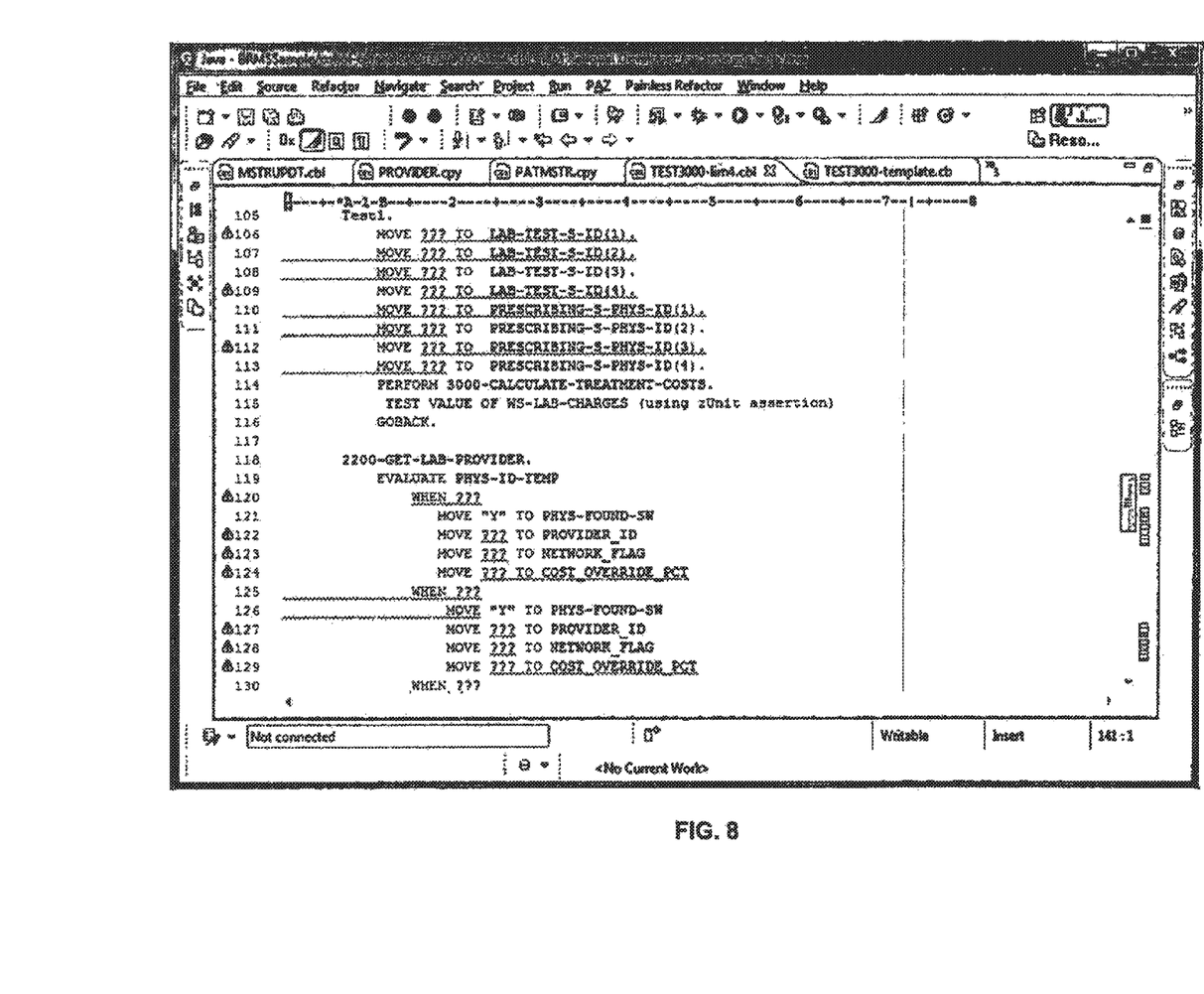
FIG. 8 is a screen capture of an exemplary mock code segment created for testing a code unit extracted from a COBOL source code, according to some embodiments of the present invention.

Reference is now made to FIG. 8, which is a screen capture of an exemplary mock code segment created for testing a code unit extracted from a COBOL source code, according to some embodiments of the present invention. A screen capture 800 presents an exemplary mock code segments such as the mock code segment 502 created by a test generator such as the test generator 212. The mock code segment 502 shown in the screen capture 800 is created to simulate interaction between a code unit such as the code unit 302 presented in the screen capture 600 with an external database such as the database 2200-GET-LAB-PROVIDER presented in the screen capture 700. As seen in the screen capture 800, the mock code segment 502 is created with constant values to simulate the database 2200-GET-LAB-PROVIDER. The missing data items marked with the ??? sign may be generated manually and injected by the user. Optionally, the missing data items may be assigned by the tester 214 based on the analysis of the code unit 302 and/or the external database 2200-GET-LAB-PROVIDER. The analysis may include, for example, dynamic code analysis and/or profiling of system tests previously generated for testing a COBOL source code such as the COBOL source code 220. The analysis may also include a static code analysis and/or symbolic execution techniques as known in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of automatically generating tests for common business-oriented language (COBOL) code units, comprising steps, performed by at least one hardware processors, of:
    designating a COBOL source code comprising a plurality of code lines;
    extracting automatically a plurality of code units each comprising a subset of said plurality of code lines for executing at least one functionality of said COBOL source code, said plurality of code units are identified by analyzing said plurality of code lines;
    manipulating each of said plurality of code units to be independently executable;
    generating automatically at least one test for testing each of said plurality of code units by generating an input stimulus for said each code unit, and
    creating at least one mock code segment to simulate access interaction of said each code unit with at least one external code segment of said COBOL source code, said external code segment comprising at least one code line of said COBOL source code which is not included in said each code unit; and
    testing individually each of said plurality of code units by independently executing each of said plurality of code units and by using said at least one test and said at least one mock code segment.

2. The computer implemented method of claim 1, wherein said plurality of code units coupled with at least one remaining code line of said plurality of code lines maintain an execution behavior of said COBOL source code, said at least one remaining code line is not included in said plurality of code units.

3. The computer implemented method of claim 1, wherein said analysis comprises at least one of: a text analysis, a static code analysis and a dynamic code analysis.

4. The computer implemented method of claim 1, wherein said interaction comprises accesses from said each code unit to said at least one external segment, said accesses are made as part of at least one of: control flow and data flow of an execution of said COBOL source code.

5. The computer implemented method of claim 1, wherein said interaction is identified by a code analysis comprising at least one of: a static analysis and a dynamic analysis.

6. The computer implemented method of claim 1, further comprising extending said each code unit with at least one missing flow control code entry to make said each code unit an executable code entity.

7. The computer implemented method of claim 1, further comprising said at least one test includes setting at least one value in said at least one mock code segment to support said at least one test.

8. The computer implemented method of claim 7, wherein said at least one value is set by a user.

9. The computer implemented method of claim 1, wherein said analyzing said COBOL source code includes text analysis for analyzing at least one document associated with said COBOL source code to identify at least one traceability link between said at least one document and said COBOL source code.

10. The computer implemented method of claim 1, wherein at least one of said plurality of subsets of code lines is distributed in said COBOL source code, such that code lines comprising said at least one of said plurality of subsets of code lines are tangled with code lines of another one of said plurality of subsets of code lines.

11. A system for automatically generating tests for common business-oriented language (COBOL) code units, comprising:
    an input/output (I/O) interface; and
    at least one hardware processor coupled to said I/O interface and a program store for executing code stored in the program store, said code comprising:
    code instructions to designate a COBOL source code using said input interface, said COBOL source code comprises a plurality of code lines;
    code instructions to extract automatically a plurality of testable code units each comprising a subset of said plurality of code lines for executing at least one functionality of said COBOL source code, said plurality of code units are identified by analyzing said plurality of code lines;
    code instructions to manipulate each of said plurality of code units to be independently executable;

code instructions to generate automatically at least one test for testing said each code unit by generating an input stimulus for said each code unit, and creating at least one mock code segment to simulate access interaction of said each code unit with at least one external code segment of said COBOL source code, said external code segment comprising at least one code line of said COBOL source code which is not included in said each code unit; and code instructions to individually test each of said plurality of code units by independently executing each of said plurality of code units and by using said at least one test and said at least one mock code segment.

12. The system of claim 11, further comprising a user interface coupled to said at least one hardware processor for communicating with a user.

13. The system of claim 11, wherein said analysis comprises at least one of: a text analysis, a static code analysis and a dynamic code analysis.

14. The system of claim 11, wherein said interaction comprises accesses from said each code unit to said at least one external segment, said accesses are made as part of at least one of: control flow and data flow of an execution of said COBOL source code, said interaction is identified by a code analysis comprising at least one of: a static analysis and a dynamic analysis.

15. The system of claim 11, further comprising extending said each code unit with at least one missing flow control code entry to make said each code unit an executable code entity.

16. The system of claim 11, further comprising said at least one test includes setting at least one value in said at least one mock code segment to support said at least one test.

17. The system of claim 16, wherein said at least one value is set by a user.

18. A computer program product for automatically generating tests for common business-oriented language (COBOL) code units, comprising:

a non-transitory computer readable storage medium;

first program instructions to designate a COBOL source code comprising a plurality of code lines;

second program instructions to extract automatically a plurality of testable code units each comprising a subset of said plurality of code lines for executing at least one functionality of said COBOL source code, said plurality of code units are identified by analyzing said plurality of code lines;

third program instructions to manipulate each of said plurality of code units to be independently executable;

fourth program instructions to generate automatically at least one test for testing said each code unit by generating an input stimulus for said each code unit, and creating at least one mock code segment to simulate access interaction of said each code unit with at least one external code segment of said COBOL source code, said external code segment comprising at least one code line of said COBOL source code which is not included in said each code unit; and fifth program instructions to test individually each of said plurality of code units by independently executing each of said plurality of code units and by using said at least one test and said at least one mock code segment;

wherein said first, second, third, and fourth and fifth program instructions are executed by at least one hardware processor from said non-transitory computer readable storage medium.

19. The computer program product of claim 18, wherein said analysis comprises at least one of: a text analysis, a static code analysis and a dynamic code analysis.

20. The computer program product of claim 18, wherein said interaction comprises accesses from said each code unit to said at least one external segment, said accesses are made as part of at least one of: control flow and data flow of an execution of said COBOL source code, said interaction is identified by a code analysis comprising at least one of: a static analysis and a dynamic analysis.

21. The computer program product of claim 18, further comprising fifth program instructions to extend said each code unit with at least one missing flow control code entry to make said each code unit an executable code entity.

22. The computer program product of claim 18, further comprising said at least one test includes setting at least one value in said at least one mock code segment to support said at least one test.

* * * * *